United States Patent

Gunderson

[11] Patent Number: 5,857,284
[45] Date of Patent: Jan. 12, 1999

[54] SPINNER FISHING LURE

[76] Inventor: Anthony E Gunderson, 7100 Kootenai Rd., Sandpoint, Id. 83864

[21] Appl. No.: 812,400

[22] Filed: Mar. 5, 1997

[51] Int. Cl.[6] ...................................................... A01K 85/00
[52] U.S. Cl. ........................................... 43/42.13; 43/42.11
[58] Field of Search .................................. 43/42.1, 42.11, 43/42.13, 42.25

[56] References Cited

U.S. PATENT DOCUMENTS

| D. 326,497 | 5/1992 | Greve | D22/129 |
|---|---|---|---|
| 3,546,804 | 12/1970 | Woolums | 43/42.11 |
| 3,768,194 | 10/1973 | Murray | 43/42.1 |
| 4,799,329 | 1/1989 | Paulsen | 43/42.25 |
| 5,226,268 | 7/1993 | Sisson, Jr. | 43/42.13 |

OTHER PUBLICATIONS

Pp. 171–174 of "Bass Pro Shops", (no date).

*Primary Examiner*—Daniel D. Wasil
*Attorney, Agent, or Firm*—David S. Thompson

[57] ABSTRACT

A novel spinner fishing lure is disclosed. In a preferred embodiment, the lure provides a planar head having a blade-like or keel-like shape having a slightly wider front edge which tapers to a slightly narrower rear edge, and that supports an eye on each side that is typically painted or stuck on. An arm having an R-bend, extending from a nose on the head, carries a swivel which in turn carries a blade. A neck portion, adjacent to the planar head, supports a rearwardly directed skirt attachment post. In the preferred embodiment, the skirt attachment post provides an upwardly directed barb, which retains a rubber collar used to attach a skirt, typically comprising a plurality of plastic filaments. A body portion having a width several times that of the planar head extends rearwardly from the neck portion. The lower surface of the body portion typically forms a strike zone surface which is generally uncovered by the skirt due to the position of the skirt attachment post, behind the neck. A hook extends from the rear of the body. The lure is typically made of zinc, and weighs approximately 3/8 of an ounce.

2 Claims, 2 Drawing Sheets

SPINNER FISHING LURE

CROSS-REFERENCES

There are no applications related to this application filed in this or any foreign country.

BACKGROUND

A large number of spinner fishing lures are currently known and used.

Most spinner fishing lures suffer from one or more flaws, making them less effective. A principle problem is that most spinner fishing lures do not adequately resemble a small fish.

A further problem with known spinner fishing lures is that the skirting worn by most spinner fishing lures serves to pad or buffer the bottom of the body of the lure, thereby reducing the sound made as the lure moves through the water and across rocks and other underwater structures.

A further problem with known spinner fishing lures is that they do not have a head that is separate from the body.

A still further problem with known spinner fishing lures is that a large part of the skirt is parallel to, and adjacent to, the body, and therefore does not contribute to the "fullness" of the lure.

For the foregoing reasons, there is a need for a new spinner fishing lure that more accurately resembles a small sunfish. The lure must additionally carry any skirting material in a manner that does not pad the bottom of the body of the lure, and must carry the skirting material in a manner that most efficiently contributes to the appearance of "fullness" and realism.

SUMMARY

The present invention is directed to an apparatus that satisfies the above needs. A novel spinner fishing lure is provided that more accurately resembles a small fish, and that provides structures that more advantageously carry the skirting material and move the lure through the water.

The spinner fishing lure of the present invention provides some or all of the following structures:

(a) A planar head, having a blade or keel shape having a slightly wider front edge with tapers to a slightly narrower rear edge, and that supports an eye on each side that is typically painted or glued on.

(b) A wire arm having an R-bend, extending from the nose of the head, carries a swivel which in turn carries a blade.

(c) A neck portion, adjacent to the planar head, supporting a rearwardly directed skirt attachment post. In the preferred embodiment, the skirt attachment post provides an upwardly directed barb, which retains a rubber collar used to attach the skirt.

(d) A body portion having a width several times that of the planar head, the lower surface of the body portion typically forming a strike zone surface which is generally uncovered by the skirt.

It is therefore a primary advantage of the present invention to provide a novel spinner fishing lure that provides skirt attachment post that is suited to carry a skirt in a manner that does not completely cover the body, and does not cover a strike zone surface on the lower portion of the body.

Another advantage of the present invention is to provide a novel spinner fishing lure that has a flat, planar head that reflects more light than the lures in the present market, making it easy for fish to see.

Another advantage of the present invention is to provide a novel spinner fishing lure that is made of zinc, and which creates a desirable sound upon impact, particular when impacted on the strike zone, is more visible that a lure made of lead of the same ⅜ weight, and is more environmentally friendly.

A still further advantage of the present invention is to provide a novel spinner fishing lure that provides a body that is wider than the head, the body having a strike zone surface on its lower portion that is not covered by the skirt.

DRAWINGS

These and other features, aspects, and advantages of the present invention will become better understood with regard to the following description, appended claims, and accompanying drawings where:

DESCRIPTION

Figure 1:
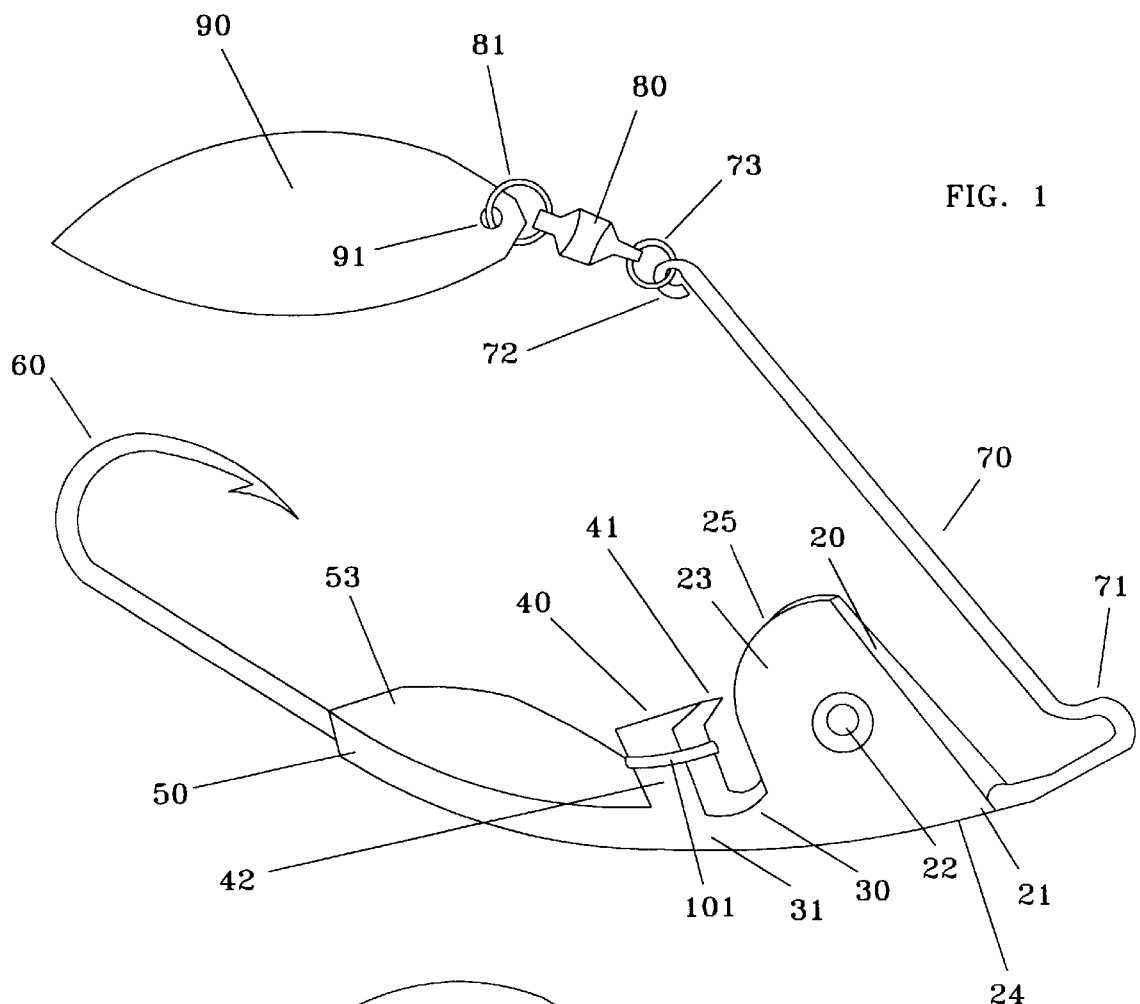
FIG. 1 is a perspective view of a version of a version of the spinner fishing lure of the invention, having the skirt removed to better reveal the structure of the lure, but having the rubber collar still in place.
Figure 2:
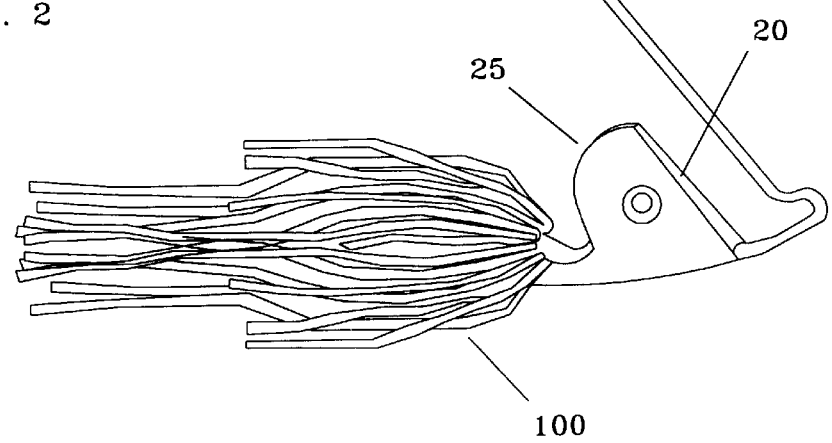
FIG. 2 is a perspective view of the lure of FIG. 1, having the skirt attached.
Figure 3:
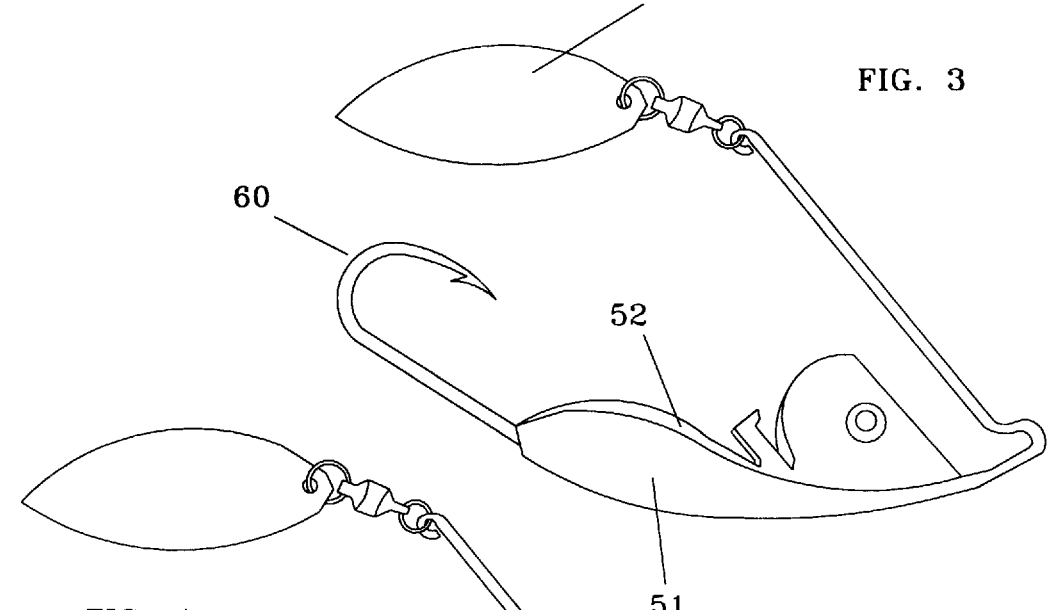
FIG. 3 is a perspective view of the lure of FIG. 1, better showing the strike zone surface of the body.
Figure 4:
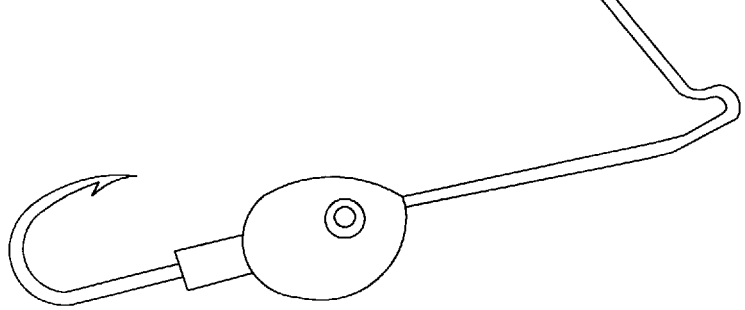
FIG. 4 is an example of the prior art.

Referring generally to FIGS. 1 through 3, a spinner fishing lure constructed in accordance with the principles of the invention is seen. In a preferred embodiment, the spinner fishing lure provides a planar head 20 having a blade or keel shape having a slightly wider front edge which tapers to a slightly narrower rear edge, and that supports an eye on each side that is typically painted or glued on. An arm having an R-bend, extending from a nose on the head, carries a swivel which in turn carries a blade. A neck portion, adjacent to the planar head, supports a rearwardly directed skirt attachment post. In the preferred embodiment, the skirt attachment post provides an upwardly directed barb, which retains a rubber collar used to attach a skirt, typically comprising a plurality of plastic filaments. A body portion having a width several times that of the planar head extends rearwardly from the neck portion. The lower surface of the body portion typically forms a strike zone surface which is generally uncovered by the skirt due to the position of the skirt attachment post, behind the neck. The lure is typically made of zinc, and weighs approximately ⅜ of an ounce.

The invention resides not in any one of these features per se, but rather in the particular combination of all of them herein disclosed and claimed and it is distinguished from the prior art in this particular combination of all of its structures for the functions specified.

Referring to the figures, the planar head 20 provides planar side surfaces 23 that taper from a slightly broader front edge 24 to a slightly narrower rear edge 25. A stick-on eye 22 is located near the front edge, and may be replaced by a painted on eye, if desired. The nose 21 is attached to the arm 70, and is the forward-most portion of the head.

The wire arm 70 extends forwardly from the nose 21, forms an R-bend 71, and then extends upwardly and rearwardly, terminating in a loop or hook 72. A first split ring 73 is attached to the hook 72 and to a forward end of a swivel 80. The rearward end of the swivel carries a second split ring 81 which in turn is attached to a blade 90 by means of eyelet opening 91.

Adjacent to, and extending downwardly and rearwardly from the planar head 20 is a neck 30 having a rear portion 31 carrying a skirt attachment post 40. The skirt attachment post carries a skirt 100 made of a plurality of plastic filaments. Similar skirts are well known for use with spinner fishing lures, and are typically attached by means of a rubber collar 101. The skirt attachment post has generally planar side surfaces 42, and provides an upwardly directed barb 41. The barb 41 prevents a rubber collar from falling off.

Figure 2A:
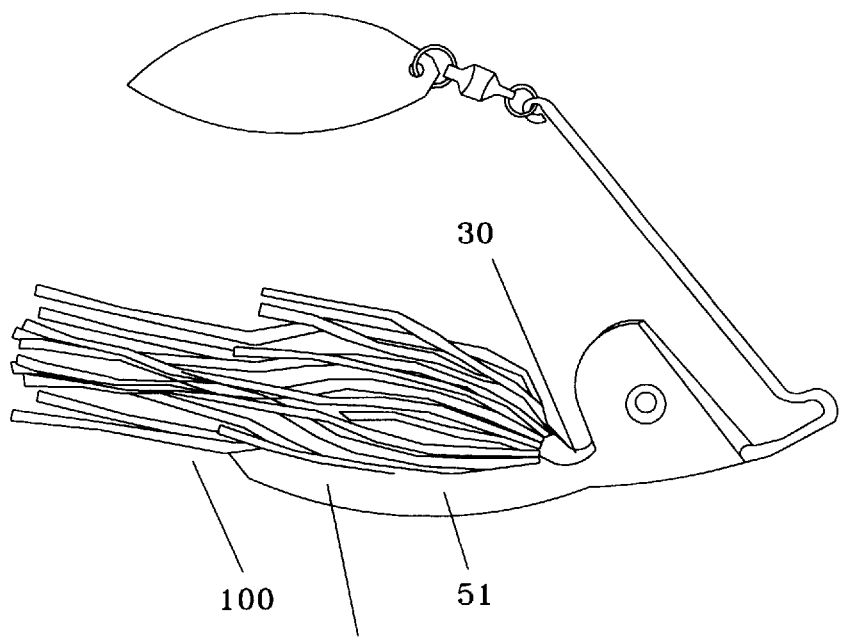
FIG. 2a is a view similar to that of FIG. 2.

Adjacent to, and extending rearwardly from the neck 30 is a body 50. The body provides a strike zone surface 51 on its lower portion, side edges 52 and a top surface 53. As seen in FIG. 2, and particularly in FIG. 2*a*, the strike zone surface 51 is not covered by the skirt 100, which means that when the strike zone surface hits a rock or other object is will cause the lure to resonate at an audible frequency. A hook 60 extends from the rear of the body.

The body is typically made of zinc, and exclusive of the hook, arm, swivel and blade and skirt, weighs approximately ⅜ of an ounce. The body is typically cast in a mold. However, to make the planar head 20 sufficiently narrow, it may be desirable to grind some of the material off the head. Often, this is done in a manner that results in the rear edge 25 being slightly narrower than the front edge 24. The body is then painted, typically by powder paint. Commercially available stick-on eyes may be applied to each side of the head.

A multi-filament or multi-stranded skirt 100 may be attached to the skirt attachment post 40 by means of a rubber collar. The rubber collar should be positioned between the rear portion 31 of the neck 30 and the barb 41. A fishing line is then attached to the R-bend 71, and the lure is used in the same manner as a conventional lure.

The previously described versions of the present invention have many advantages, including a primary advantage of providing a novel spinner fishing lure that provides skirt attachment post that is suited to carry a skirt in a manner that does not completely cover the body, and does not cover a strike zone surface on the lower portion of the body.

Another advantage of the present invention is to provide a novel spinner fishing lure that has a flat, planar head that provides greater surface area for colored paint.

Another advantage of the present invention is to provide a novel spinner fishing lure that is made of zinc, and which creates a desirable sound upon impact, particular when impacted on the strike zone.

A still further advantage of the present invention is to provide a novel spinner fishing lure that provides a body that is wider than the head, the body having a strike zone surface on its lower portion that is not covered by the skirt.

Although the present invention has been described in considerable detail and with reference to certain preferred versions, other versions are possible. For example, subtle variations in the size, shape and appearance of the lure, while still in keeping with the teachings of the invention, could be envisioned. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A spinner fishing lure, comprising:
   (a) a planar head;
   (b) a neck portion, adjacent to the planar head, supporting a rearwardly directed skirt attachment post having a barb;
   (c) a body portion having a width several times that of the planar head, the lower surface of the body portion forming a strike zone surface;
   (d) an arm, attached to a nose portion of the head, the arm having an R-bend and terminating in a hook;
   (e) a swivel, carried by the hook; and
   (f) a blade, carried by the swivel.

2. The spinner fishing lure of claim 1, further comprising:
   (a) a skirt, carried by the skirt attachment post.

* * * * *